(12) United States Patent
Pidria et al.

(10) Patent No.: US 12,286,914 B2
(45) Date of Patent: Apr. 29, 2025

(54) INTERCONNECTION SYSTEM OF A UREA-BASED REDUCING AGENT INJECTOR TO AN AFTER-TREATMENT AN EXHAUST GAS DEVICE

(71) Applicant: FPT INDUSTRIAL S.P.A, Turin (IT)

(72) Inventors: Marco Federico Pidria, Turin (IT); Luca Vargiu, Turin (IT); Giuseppe Inghilterra, Turin (IT); Gemma Damiani, Turin (IT); Felice Carlo Nuovo, Turin (IT); Andrea Renzullo, Turin (IT)

(73) Assignee: FPT INDUSTRIAL S.P.A, Turin (IT)

( * ) Notice: Subject to any disclaimer, the term of this patent is extended or adjusted under 35 U.S.C. 154(b) by 0 days.

(21) Appl. No.: 18/549,601

(22) PCT Filed: Mar. 7, 2022

(86) PCT No.: PCT/IB2022/051987
§ 371 (c)(1),
(2) Date: Sep. 8, 2023

(87) PCT Pub. No.: WO2022/195397
PCT Pub. Date: Sep. 22, 2022

(65) Prior Publication Data
US 2025/0027438 A1 Jan. 23, 2025

(30) Foreign Application Priority Data
Mar. 15, 2021 (IT) .......................... 102021000006143

(51) Int. Cl.
*F01N 13/18* (2010.01)
*F01N 3/20* (2006.01)

(52) U.S. Cl.
CPC ....... *F01N 13/1855* (2013.01); *F01N 3/2066* (2013.01); *F01N 13/1872* (2013.01); *F01N 2260/20* (2013.01); *F01N 2310/02* (2013.01); *F01N 2450/24* (2013.01);
(Continued)

(58) Field of Classification Search
CPC .............. F01N 13/1855; F01N 3/2066; F01N 13/1872; F01N 2260/20; F01N 2310/02; F01N 2450/24; F01N 2530/26; F01N 2610/02; F01N 2610/1453
See application file for complete search history.

(56) References Cited

U.S. PATENT DOCUMENTS

| | | | |
|---|---|---|---|
| 2014/0196442 A1* | 7/2014 | Katou ..................... | F01N 3/208 60/286 |
| 2014/0237998 A1* | 8/2014 | Fahrenkrug .......... | F01N 3/2066 123/470 |
| 2016/0215675 A1* | 7/2016 | Muruganantham .. | B01D 53/944 |
| (Continued) | | | |

FOREIGN PATENT DOCUMENTS

EP 3098407 A1 11/2016

*Primary Examiner* — Brandon D Lee
(74) *Attorney, Agent, or Firm* — Bayramoglu Law Offices LLC

(57) ABSTRACT

System for interconnecting a urea-based reducing agent injector to an exhaust gas post-treatment device including an injector, a flange arranged to couple the injector to an exhaust gas line, a gasket arranged between the injector and the flange, wherein the gasket is a sandwich, formed by two external layers and an intermediate layer formed by insulating material.

18 Claims, 3 Drawing Sheets

(52) U.S. Cl.
CPC ...... *F01N 2530/26* (2013.01); *F01N 2610/02* (2013.01); *F01N 2610/1453* (2013.01)

(56) References Cited

U.S. PATENT DOCUMENTS

2017/0298485 A1* 10/2017 Sawada ................... C22C 38/50
2019/0292971 A1*  9/2019 McFarland ............. F01N 13/08

* cited by examiner

INTERCONNECTION SYSTEM OF A UREA-BASED REDUCING AGENT INJECTOR TO AN AFTER-TREATMENT AN EXHAUST GAS DEVICE

CROSS REFERENCE TO THE RELATED APPLICATIONS

This application is the national phase entry of International Application No. PCT/IB2022/051987, filed on Mar. 7, 2022, which is based upon and claims priority to Italian Patent Application No. 102021000006143, filed on Mar. 15, 2021, the entire contents of which are incorporated herein by reference.

TECHNICAL FIELD

The present invention relates to the field of exhaust gas post-treatment systems (ATS) and in particular to a system for connecting a urea-based reducing agent injector to an exhaust gas duct arranged to feed an SCR (Selective Catalytic Reduction) or SCROF (Selective Catalytic Reduction on Filter).

The injection of a urea-based reducing agent in combination with an SCR or SCROF catalyst is one of the most reliable systems for reducing the NOx produced by an internal combustion engine, especially a Diesel cycle.

The performance of the injector is essential as the precise dosage of the agent is essential in order not to compromise the performance of the ATS system.

The injector is known per se and is associated, through an interconnection flange, with a conduit that carries exhaust gas.

The interconnection flange is therefore interposed between the duct and the injector.

Generally, a metal gasket is interposed between the flange and the nozzle in order to ensure a seal between the nozzle and the flange itself.

The portion of the flange that surrounds the injector is shaped in a divergent way, so as to limit the exposure of the injector to high temperatures and at the same time so as not to interfere with the jet generated by the nozzle.

Despite this precaution of the shape of the flange, solid deposits are sometimes formed at the end of the nozzle which leads to a non-optimal injection of urea-based reducing agent with a general deterioration in the performance of the ATS system.

To overcome these problems, currently, it is necessary to disassemble the nozzle with a certain cyclicality and to clean it with an increase in costs and vehicle stoppage.

If not specifically excluded in the detailed description that follows, what is described in this chapter is to be considered as an integral part of the detailed description.

SUMMARY

The object of the present invention is to propose a system for the interconnection of a urea-based reducing agent injector to a duct intended to transport an exhaust gas towards an SCR or SCROF, capable of reducing the above problems.

The basic idea of the present invention is to implement an insulating gasket instead of the classic metal gasket between the flange and the nozzle.

The insulating gasket, according to the present invention, comprises a sandwich formed by two external metal layers, between which an insulating layer is interposed.

More specifically, the insulating layer substantially extends the entire gasket including the perimeter areas of the openings corresponding to the fixing points of the injector to the fixing flange.

Furthermore, according to the present invention, the external metal layer intended to contact the fixing flange is shaped to confine a volume of air that annularly surrounds the injector tip.

In other words, a double multilayer gasket is defined, where a first area, annular with respect to the tip of the injector, insulated by air, and a remaining area that extends to the openings for fixing the injector to the flange, which exploits the aforementioned insulating layer.

The insulating layer is preferably made of materials with strong thermal insulation characteristics, such as ceramic material, ceramic fiber, glass fiber, mica, graphite, basalt wool, etc.

It preferably has a thickness between 1 and 4 mm, according to the thermal load specifications of the component, preferably 3 mm for medium and heavy industrial vehicles, but other thicknesses can be identified for different applications.

According to a further preferred aspect of the invention, the metal layer which confines the volume of air comprises a through opening at the tip of the injector, with a folded edge so that, in operating conditions, it annularly contacts the face of the injector tip.

More preferably, the edge is equipped with a profile designed to minimize the thermal bridge between the same metal layer and the tip of the injector, for example it is equipped with teeth evenly distributed along the edge.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely by way of non-limiting explanation, in which.

The same reference numbers and letters in the figures identify the same elements or components or functions.

It should also be noted that the terms "first", "second", "third", "upper", "lower" and the like can be used here to distinguish various elements. These terms do not imply a spatial, sequential or hierarchical order for the modified elements unless specifically indicated or inferred from the text.

The elements and features illustrated in the various preferred embodiments, including the drawings, can be combined with each other without however departing from the scope of the present application as described below.

DETAILED DESCRIPTION OF THE EMBODIMENTS

Figure 1:
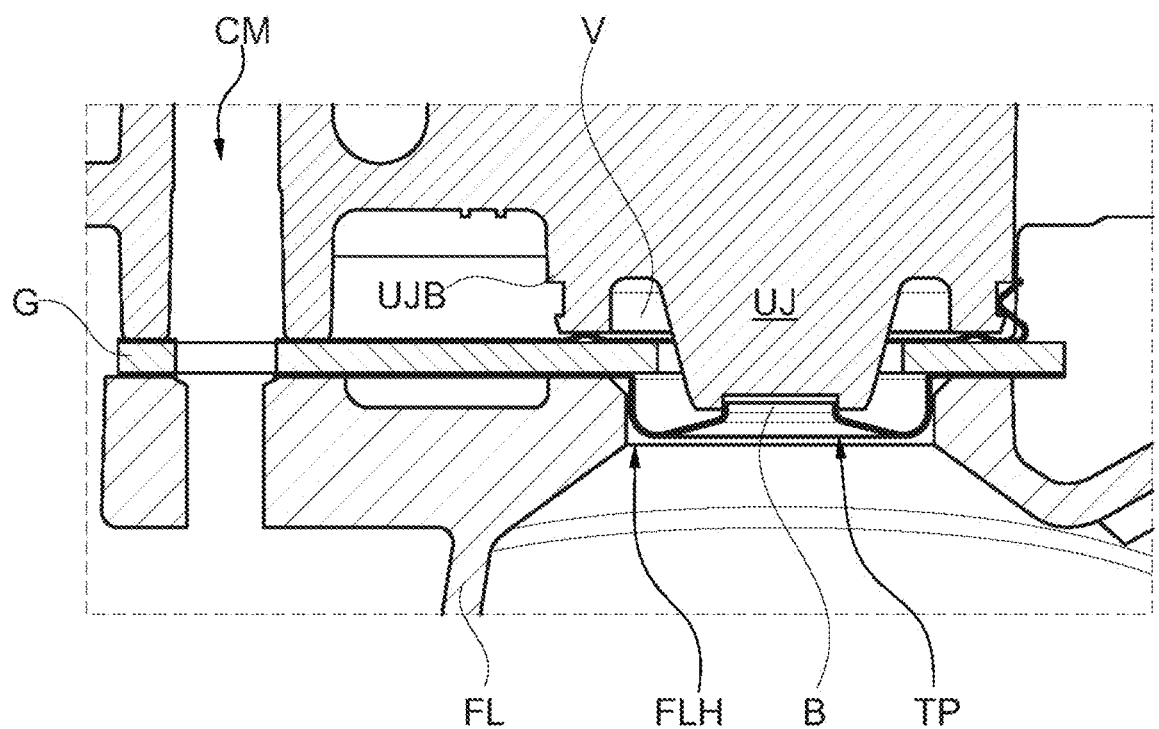
FIG. 1 shows a section of a connection system of an injector of a urea-based reducing agent according to a plane passing through an axis of the injector, according to a preferred example of the present invention.

FIG. 1 shows a system for fixing a nozzle UJ to a duct (not shown) connected with an SCR (not shown) for the injection of a urea-based reducing agent.

The system includes a flange FL known per se, having a through opening that surrounds, in operating conditions, the nozzle with a shape that diverges from the nozzle.

Figure 2:
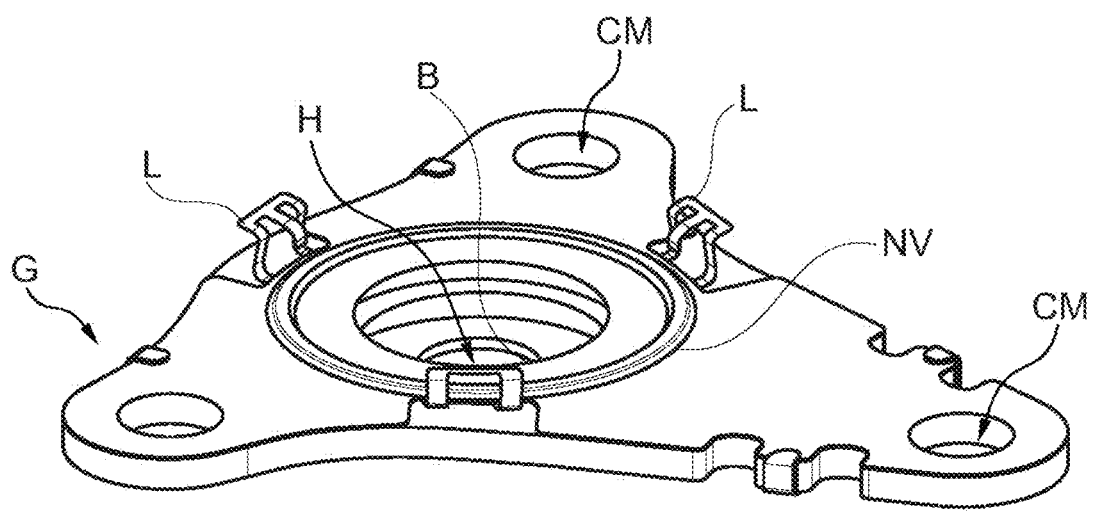
FIG. 2 shows a perspective view of a gasket according to FIG. 1.
Figure 3:
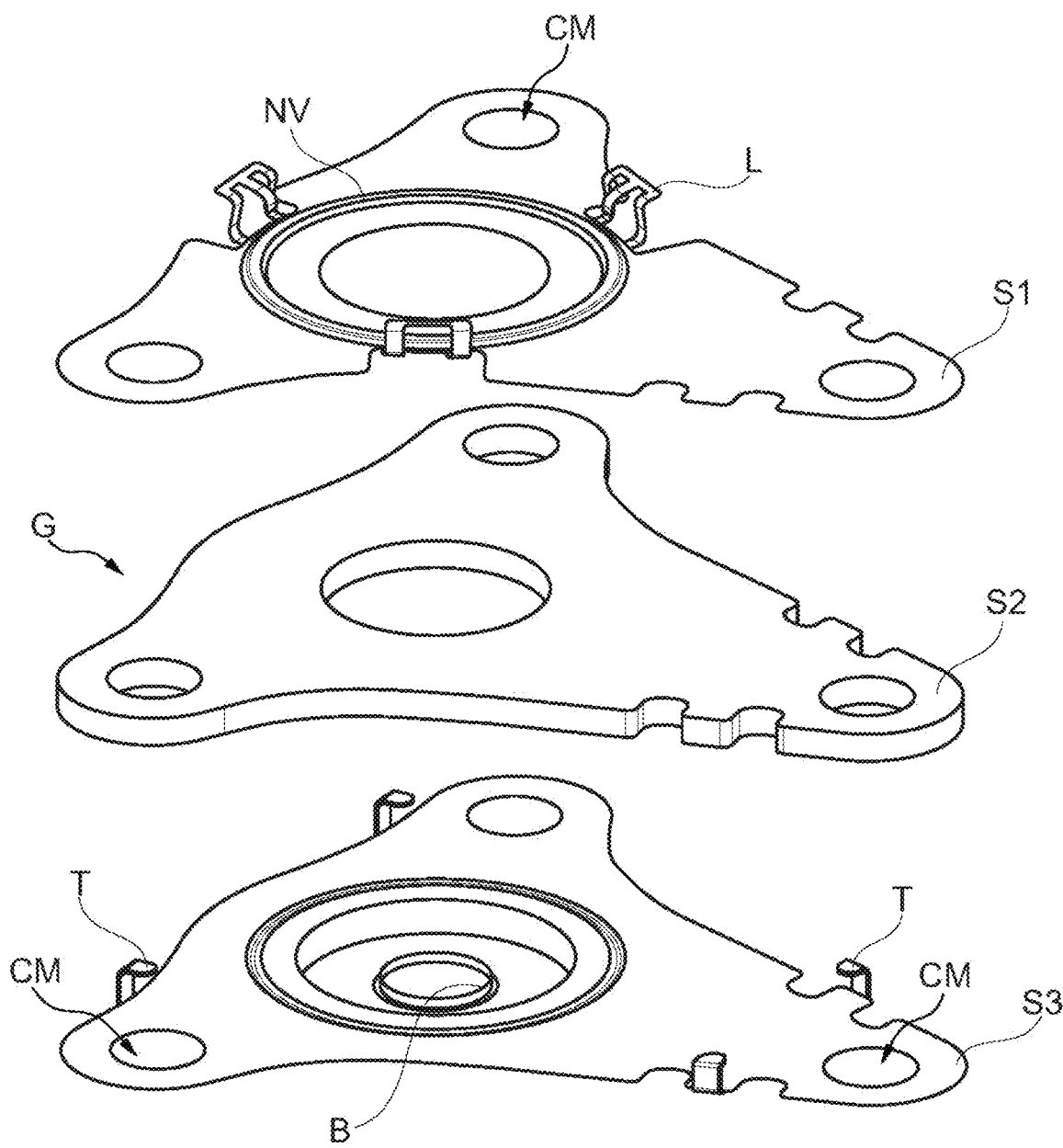
FIG. 3 shows an exploded view of the gasket of FIG. 2.
Figure 4:
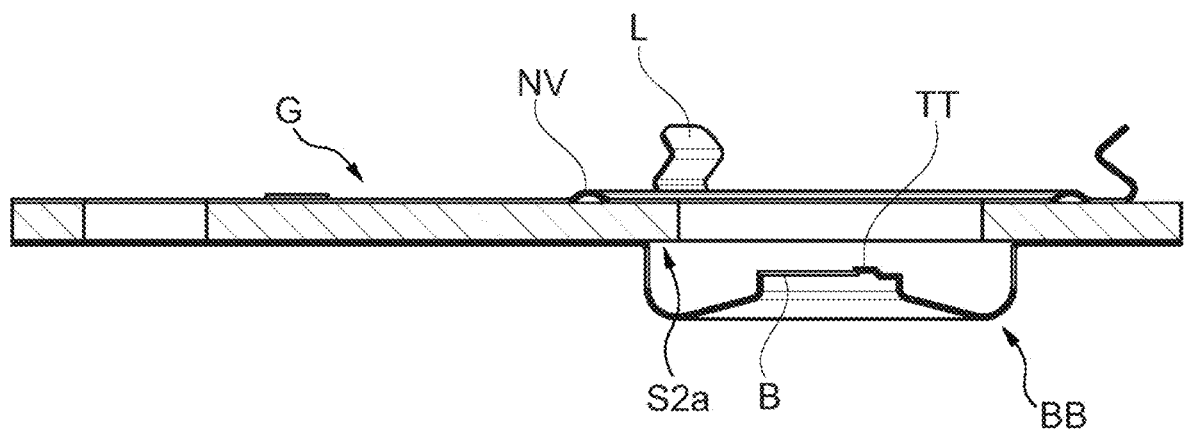
FIG. 4 shows only the gasket extracted from FIG. 1.

Between the flange FL and the nozzle UJ there is a gasket G according to the present invention, better shown with the aid of FIGS. 2-4.

The gasket comprises a first layer S1 and a third layer S3 of metallic material, for example ferritic or austenitic stainless steel.

The second layer S2, interposed between the first and the third, is made of solid insulating material with strong thermal insulation characteristics, such as ceramic material, ceramic fiber, glass fiber, mica, graphite, basalt wool, etc.

The sandwich conformation, as can be clearly seen from FIG. 3, concerns the entire gasket and not just portions of it. This means that the intermediate layer is continuous and has a shape and size at least equal to the first layer S1.

The third layer S3 comprises first tabs T folded in such a way as to grip the first layer S1 while keeping all three layers sandwiched together.

The first layer S1 includes second tabs L to hook the gasket to the body UJB of the injector UJ.

The gasket, shapes substantially flat, has a through opening H arranged so as not to interfere with the injection of urea-based reducing agent.

With reference to FIG. 4 it is understood that the gasket is substantially flat with the exception of the area surrounding the UJ nozzle, where a camber BB projects, in operating conditions, into the through opening FLH of the flange FL. The gasket also has a through opening H, through which the nozzle is free to inject the urea-based reducing agent into an exhausted gas stream. Evidently, the through opening H is common to all three layers as disclosed in the exploded view of FIG. 3.

The camber BB has a vaguely toroidal shape cut by the gasket plane.

The through opening H in the third layer is made so that the camber BB encloses an air volume that surrounds the injector, therefore the same gasket defines a metal/air gasket in the immediate vicinity of the injector and then a metal/insulating-solid/metal gasket in the remaining gasket extension.

The camber is advantageously made only by the third layer S3 which is the one most exposed to high temperatures.

As can be seen in FIG. 3, the through opening H is wider in the first layer S1, a little less wide in the intermediate layer S2 and has the smaller width in the layer S3. This fact is necessary to create an air cushion around the injector.

Furthermore, observing FIG. 4, it is noted that the portion S2a of the intermediate layer projects into the small air leg, so that four layers are obtained in the immediate vicinity of the injector: S3, air, S2 and S1.

Preferably, the first and second layers of the gasket have a through opening H at the injector having a greater width than an opening defined by the third layer S3, so that the volume of air surrounding the injector is unique, i.e. not partitioned into subvolumes.

Preferably, the air volume is confined between the first layer in contact with the injector body UJB, the injector, the third layer in contact with the injector tip and the second layer of the gasket.

In addition, the third layer, in addition to defining the aforementioned camber BB that projects into the through opening FLH of the flange, has an edge B of the relative through opening H folded to contact a tip TP of the injector and precisely the face of the injector tip.

In particular, the injector is equipped with an annular recess and the annular edge B of the camber is folded in order to fit into the recess. In other words, edge B fits into the injector portion.

Spacers are preferably distributed along the edge, for example, in the form of teeth TT to minimize a heat exchange between the third layer and the face of the injector.

The gasket G comprises through openings CM for fixing the injector to the flange by means of fixing screws and where the second layer S surrounds each of said through openings.

The insulating material is preferably of constant thickness up to surround the through openings CM intended for the fixing screws that pack the injector body on the flange and on the exhaust gas duct. However, thicker areas of the insulating material can be provided. However, it is preferred that the gasket remain substantially flat, with the exception of the camber BB.

In other words, this gasket defines a particularly broad thermal insulation arranged to minimize the transmission of heat to the injector body.

In other words, the first layer S1 essentially participates in maintaining the second layer uniformly compressed and comprises an annular rib NV which has the task of making a seal with the UJB body of the injector, while the third layer acts as a protection for heat and cooperates indirectly with the first layer S1 in confining the volume of air surrounding the injector.

Preferably, the first layer is made of ferritic or austenitic stainless steel and has a thickness of 0.1 to 0.5 mm, with a preferred value of 0.3 mm.

Preferably, the third layer is made of ferritic or austenitic stainless steel and has a thickness of 0.1 to 0.5 mm with a preferred value of 0.3 mm.

With reference to FIGS. 2 and 3, it is evident that the gasket has a substantially triangular shape as there are three fixing points of the injector to the flange FL and to the exhaust gas duct. This does not prevent it from having different shapes, for example rectangular if the fixing points become four.

As regards the insulating material defining the second layer, this preferably consists of materials with remarkable thermal insulation characteristics, such as ceramic material, ceramic fiber, glass fiber, mica, graphite, basalt wool, etc. or their combinations.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. A system for interconnecting a urea-based reducing agent injector to an exhaust gas after-treatment device, wherein the system comprises;
   one injector;
   a flange arranged to couple a body of the injector to an exhausted gas duct and having a through opening designed to surround the injector; and
   a gasket, in operating conditions, is arranged between the injector and the flange, wherein the gasket is a sandwich formed by metal first and third external layers and an intermediate layer disposed between the first and third external layers, wherein the intermediate layer is composed of a solid heat-insulating material, wherein the third layer, in contact with the flange, is shaped to confine an air volume surrounding the injector, and wherein the solid heat-insulating material extends across the gasket and includes, at a periphery of the gasket, closed through holes through which the injector is fixed to the flange.

2. The system according to claim 1, wherein the first and intermediate layers of the gasket have a through opening at the injector having a greater width than an opening defined by the third layer, wherein the third layer forms the air volume surrounding the injector.

3. The system according to claim 1, wherein the air volume is confined between the first layer in contact with the injector body, the injector, the third layer in contact with an injector tip and the intermediate layer of the gasket.

4. The system according to claim 2, wherein the third layer defines a camber, wherein the camber projects into the through opening with an annular edge of a relating through opening folded to contact a tip of the injector.

5. The system according to claim 1, wherein fixing screws are disposed in the closed through holes for fixing the injector to the flange.

6. The system according to claim 1, wherein the first and third layers are made of ferritic or austenitic stainless steel.

7. The system according to claim 1, wherein the first and third layers have a thickness comprised between 0.1 and 0.5 mm.

8. The system according to claim 1, wherein the intermediate layer is formed by material with thermal insulation characteristics comprising at least one of ceramic material, ceramic fiber, glass fiber, mica, graphite, or basalt wool.

9. The system according to claim 1, wherein the intermediate layer has a thickness of between 1 and 4 mm.

10. The system according to claim 1, wherein an annular edge of the third layer contacts a front surface of the injector.

11. The system according to claim 1, wherein an annular edge of the through opening defined by the third layer comprises spacers uniformly distributed along a relative length.

12. The system according to claim 1, wherein the third layer comprises at least two first tabs adapted to grip the first layer.

13. The system according to claim 1, wherein the first layer comprises at least two second tabs adapted to grip a body of the injector by centering over the body.

14. The system according to claim 7, wherein the thickness is configured in 0.3 mm.

15. The system according to claim 9, wherein the thickness is configured in 3 mm.

16. The system according to claim 1, wherein the solid heat-insulating material extends across an entirety of the gasket.

17. A gasket for an interconnection of a urea-based reducing agent injector and a flange for a connection to an exhaust gas duct, the gasket comprising:
  metal first and third external layers; and
  an intermediate layer disposed between the first and third external layers,
  wherein the gasket, in operating conditions, is configured to be arranged between the injector and the flange, wherein the gasket is a sandwich formed by the metal first and third external layers and the intermediate layer disposed between the first and third external layers, wherein the intermediate layer is composed of a solid heat-insulating material, wherein the third layer, which is configured to be in contact with the flange, is shaped to confine an air volume surrounding the injector, and wherein the solid heat-insulating material extends across the gasket and includes, at a periphery of the gasket, closed through holes for fixing the injector to the flange.

18. The gasket according to claim 17, wherein the solid heat-insulating material extends across an entirety of the gasket.

* * * * *